Dec. 16, 1958     H. D. EPSTEIN     2,864,918
THERMOSTAT
Filed May 20, 1957
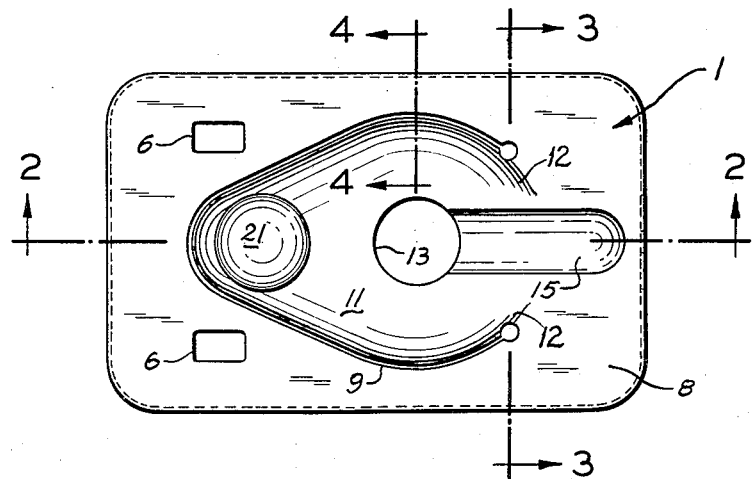
FIG. 1.
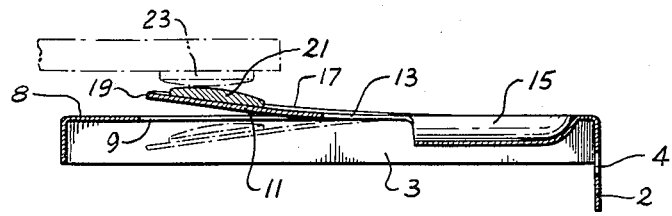
FIG. 2.
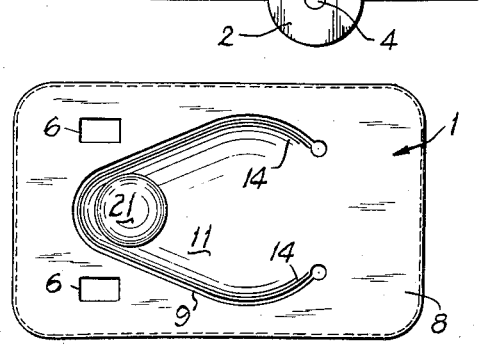
FIG. 3.
FIG. 5.
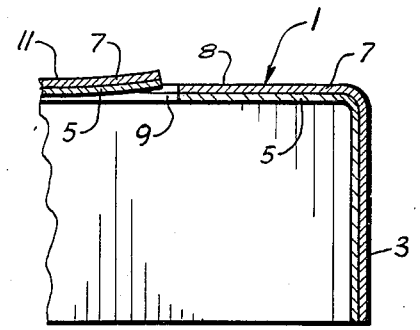
FIG. 4.
Henry David Epstein,
Inventor.
Koenig and Pope,
Attorneys.

United States Patent Office 2,864,918
Patented Dec. 16, 1958

2,864,918

THERMOSTAT

Henry David Epstein, Boston, Mass., assignor to Metals & Controls Corporation, Attleboro, Mass., a corporation of Massachusetts Application May 20, 1957, Serial No. 660,270

14 Claims. (Cl. 200—138)

This invention relates to thermostats, and with regard to certain more specific features, to the temperature-responsive elements and supporting means therefor, useful as parts of thermostatic switches.

Among the several objects of the invention may be noted the provision of a simple, compact and integral arrangement of a composite thermostatic operating member and its supporting means or base; the provision of a combination of the class described wherein the operating member, which is snap-acting, and its integral base are so formed that calibration of the operating member will not be affected by stresses in the base when the latter is fastened into a switch structure or the like, nor will the calibration of the snap-acting operating member be affected by temperature variations of the base; the provision of a combination of the class described which may be accurately but economically manufactured in quantity; and the provision of a thermostatic element which may be conveniently organized in combination with other parts to produce a low-cost, reliable and accurate thermostatic switch which is unlikely to be forced out of adjustment by applied vibrations or the like. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an enlarged plan view of one form of thermostatic element made according to my invention;

Fig. 2 is a vertical section taken on line 2—2 of Fig. 1, showing in solid lines a relatively cold position of a movable contact and in dotted lines a relatively hot position thereof, and, in addition, a cooperating stationary contact;

Fig. 3 is a cross section taken on line 3—3 of Fig. 1;

Fig. 4 is a further enlarged detail cross section taken on line 4—4 of Fig. 1; and, Fig. 5 is a plan view like Fig. 1 but on a reduced scale of an alternative form of the invention.

Corresponding reference characters indicate corresponding parts throughout the several views of the drawings.

The operating members of many thermostats are composed of thin thermostatic operating elements comprising bonded bimetallic layers such as Invar and brass, or other composite bonded layers of metal, formed with so-called nondevelopable, dimpled or equivalent surfaces for discontinuous or snap-acting control movements in response to temperature changes. It has been the practice to make up the composite temperature-responsive elements as separate units which are mounted by one means or another upon separate base units. This required a relatively complicated mount, such as a post or the like, between the thermostatic element and the base. This was relatively complex and costly to manufacture, particularly in the cases requiring so-called snap-acting thermostats having thin composite sheets.

According to the present invention, I construct both the base and the thermostatic element by forming and die-cutting operations or the like on a single composite sheet, the resulting base parts and thermostatically responsive parts thus remaining integral. The base portion is constructed so that the composite material forming it, in response to change in temperature, will not appreciably change its shape, whereas the thermostatic element per se is shaped accurately to respond thermostatically to temperature changes according to an initial calibration. In one form of the invention (Fig. 1) the connection between the thermostatic portion and the base portion of the resulting integral form is provided with special means for isolating the activity of the thermostatic element from the base portion; but such is not always required, as shown by another form of the invention (Fig. 5).

Referring now more particularly to Figs. 1–4 of the drawings, there is shown at numeral 1 a composite sheet, formed as a base frame with a flat top or face 8 and a downwardly directed integral peripheral, four-sided flange as shown at 3. The flange is provided on one side with an ear 2 in which is an opening 4, to provide a terminal for a line wire, such as by soldering. The sheet 1 is composed of a bimetallic or other composite material such as, for example, a layer of Invar 5 bonded to a layer of brass 7. Suitable openings 6 are punched into the composite sheet 1 for accepting fastenings for attachment of the base frame to any desired switch structure. In Figs. 2 and 3 no attempt is made to distinguish the composite layers shown in section, but these appear on the enlarged scale of Fig. 4.

At numeral 9 is shown an opening formed by a die cut or the like, by means of which an inner tongue portion 11 of the composite material is relieved from the sheet 1. This portion 11 has a central opening 13 therein which is located at one end of a downwardly pressed bulged part or rib 15, the latter ending at its other end in the flat portion 8. The relieved portion 11 is also pressed into a nondevelopable dish, dome or like shape 17 and curved as shown, whereby its outer end 19 when cold is positioned out of the plane of the top 8. The rib 15 allows some of the nondevelopable formation of the tongue 11 to extend somewhat into the plane of the top 8 (as suggested by the shading at 12) while at the same time preventing any stresses due to mounting at openings 6 from affecting the temperature calibration of the snap action of tongue 11. Near the outer end of tongue 11 a contact 21 is welded or otherwise attached. This contact 21 is adapted to be engaged with a suitably positioned stationary contact 23 of a switch assembly when the device of the invention is installed therein by attachment at openings 6. Upon heating and arriving at a predetermined temperature, the internal stresses in the portion 17 will cause it to snap from the solid-line position in Fig. 2 to the dotted-line position shown, whereupon any circuit closed by the contacts 21, 23 will be opened. It will be understood that, instead of one rib 15 being used at the junction between the nondevelopable tongue 11 and top 8, several ribs may be employed at this point with the same effect of isolating stresses in parts 8 and 3 from the temperature-induced stresses in tongue 11 and thus accurately preserving initial calibration in 11 for proper temperature response when in use.

In order to obtain the action illustrated in Fig. 2, the brass layer component 7, having a coefficient of expansion which is higher than that of the other Invar component 5, is arranged to be on the outside of the integral assembly, so that it appears on the upper side of the snap-acting portion 11. It is apparent from Fig. 2 that the snap action carries the portion 11 through the opening 9 with considerable deflection of the composite material constituting the snap-acting portion 11. Only a small amount of this motion extends to the right of line 3—3 in Fig. 1 to the top 8 or to the flange 3, because, first, the flange 3 stiffens the sheet 1, and, second, the rib 15 serves to stiffen the material in the connecting region at line 3—3 between the flexible and stiff parts 11 and 8, respectively. However, in some cases employing certain gages of composite thermostatic materials the rib 15 is not necessary, nor is the hole 13, as is illustrated in Fig. 5. In this figure, like numerals designate parts above described. In view of what has been said, further description of Fig. 5 will be unnecessary, except to point out that in the absence of a hole 13 and rib such as 15, the nondevelopable form of tongue 11 should be confined to its area and should not extend into the top 8, as indicated by shading 14 in Fig. 5. This is so that stresses due to mounting at holes 6 will be isolated from temperature-induced stresses in tongue 11, thus again preserving initial temperature calibration after mounting.

In view of the above, it will be apparent that the base portion constituted by face 8 and flange 3 may be referred to as cup-shaped, its important feature being that it is integral with the snap-acting tongue portion 11 and that it shall be provided with stiffening means against flexing up to and including the junction between it and the tongue. It will also be apparent that the thermostatic action of the nondevelopable form of tongue 11 shall be isolated from top 8, either by means of rib 15 (where the nondevelopable form of the tongue extends into 8 as in Fig. 1) or by confining this nondevelopable form to the tongue 11 only (as in Fig. 5). It may also be seen that the locations of the mounting holes 6 nearer the free end of tongue 11 than its point of attachment to area 8 minimizes transmission to the tongue of stresses due to mounting, thereby further preventing the latter from spoiling temperature calibration.

It will be appreciated that the invention has particular advantages for the construction of small, snap-acting bimetallic switches wherein the total thickness of the composite sheet is comparatively small, such as on the order of .008 inch, although this is not to be taken as limiting. The form of the device as shown in Fig. 1 is actually ⅝ inch wide by 1 inch long for the stated .008 inch thickness of bimetal. By flanging the sheet 1, it is maintained substantially rigid in form even when thin and even when subjected to the temperature which will be associated with operation (including calibration) of the relieved portion 11. Thus the rigid portion 8, 3 constitutes a rigid integral base for the relieved tongue portion 11, the former being adapted for convenient attachment to any desired rigid support without affecting the snap-acting temperature calibration of tongue 11.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A thermostat comprising an integral bimetallic sheet, said sheet having a face including means adapted to receive a fastener and having a marginal flange adapted to stiffen said face against any substantial distortion in response to temperature, said sheet having a tongue portion relieved from said face within the flange but having an integral connecting portion therewith at one of the ends of the tongue portion, said tongue portion having a nondevelopable form adapted to produce snap action in response to temperature, and a contact at the other end of said tongue portion, whereby said tongue portion and contact may move with snap action relative to said stiffened face in response to a predetermined temperature.

2. A thermostat made according to claim 1, including a stiffening bulged part in the region of the connecting portion between the tongue portion and said face.

3. A thermostat made according to claim 2, wherein said tongue portion includes an opening terminating said bulged part.

4. A thermostat made according to claim 1, wherein said nondevelopable form of said tongue portion is confined thereto.

5. A thermostat comprising an integral bimetallic sheet, said sheet having a substantially flat portion surrounded by an integral marginal flange adapted to stiffen it against any substantial distortion in response to temperature, said flat portion having a tongue portion partially cut therefrom but integrally connected therewith, an integral rib across the connection, said tongue portion having a hole therein which the rib ends, a contact supported on the tongue portion, said tongue portion being bulged for snap action, whereby said tongue portion may move in response to a predetermined temperature to move said contact with snap action relative to said stiffened flat portion.

6. A thermostat made according to claim 5, including a line terminal part formed integrally with said flange, said flat portion having at least one opening therethrough for mounting purposes.

7. A thermostat comprising a base portion formed from a composite thermostatic sheet having an integral surrounding composite marginal flange providing a cup shape, an integral composite tongue portion of said sheet partially relieved from said base portion within the confines of said cup shape, said relieved tongue portion being nondevelopably shaped in its relieved area to produce snap action relative to said base portion.

8. A thermostat made according to claim 7, including mounting means in the base portion, and means located at the connection between the tongue portion and the base portion adapted to isolate temperature-induced stresses responsible for snap action of the tongue portion from stresses induced in said base portion by connection made thereto at said mounting means with switch parts or the like.

9. A thermostat made according to claim 7, wherein the nondevelopable shape for producing snap action is confined entirely to said tongue portion.

10. A thermostat comprising a base portion formed from a composite thermostatic sheet having a continuous integral surrounding composite marginal flange providing a cup shape, an integral composite tongue portion of said sheet partially relieved from said base portion within the confines of said flange, said tongue portion being provided in its relieved area with a nondevelopable surface for snap action of its free end relative to its integral attachment with said base portion, said base portion having openings therein nearer the free end of the tongue portion than its point of attachment.

11. A thermostat composed of an integral sheet of composite thermostatic material, said sheet comprising a substantially plane base frame adapted for fixed mounting, said frame having an integral interior tongue portion relieved therefrom and which the frame surrounds, said tongue being shaped for thermostatic movement in response to temperature, said frame in its part surrounding the tongue having deformations extending from the plane of the frame adapted to stiffen it throughout against any substantial distortions which would affect the thermostatic movement of the tongue in response to temperature changes affecting both the tongue and the frame.

12. A thermostat made according to claim 11, wherein said tongue has a shape adapted for snap-acting movement in response to temperature.

13. A thermostat made according to claim 12, including at least one rib in the region of the connection between the tongue and substantially flat portions.

14. A thermostat made according to claim 12, wherein the shape of the tongue is nondevelopable and entirely confined to it.

References Cited in the file of this patent

UNITED STATES PATENTS

| | | |
|---|---|---|
| 2,528,756 | Kaser | Nov. 7, 1950 |
| 2,707,216 | Farison | Apr. 26, 1955 |

UNITED STATES PATENT OFFICE
CERTIFICATE OF CORRECTION

Patent No. 2,864,918                                    December 16, 1958

Henry David Epstein

It is hereby certified that error appears in the printed specification of the above numbered patent requiring correction and that the said Letters Patent should read as corrected below.

Column 4, line 21, for "therein which" read -- therein in which --; line 72, for "affeting" read -- affecting --.

Signed and sealed this 24th day of March 1959.

(SEAL)
Attest:

KARL H. AXLINE                                               ROBERT C. WATSON
Attesting Officer                                      Commissioner of Patents